United States Patent [19]

McNinch, Jr.

[11] Patent Number: 4,818,035
[45] Date of Patent: Apr. 4, 1989

[54] TRACTOR-TRAILER BRAKE CONTROL SYSTEM

[75] Inventor: Joseph H. McNinch, Jr., Livonia, Mich.

[73] Assignee: Eaton Corporation, Cleveland, Ohio

[21] Appl. No.: 43,009

[22] Filed: Apr. 27, 1987

[51] Int. Cl.[4] .......................... B60T 8/00; B60T 8/58; B60T 7/12
[52] U.S. Cl. ............................................ 303/7; 303/15; 303/9.69; 303/100; 188/112 R; 280/DIG. 14
[58] Field of Search ....................... 188/3 R, 112, 195; 280/432, 433, DIG. 14; 303/7, 15, 16, 17, 6 M, 20, 22 R, 100, 9.61, 9.62, 9.67, 9.69, 22.1

[56] References Cited

U.S. PATENT DOCUMENTS

| | | | |
|---|---|---|---|
| 3,479,094 | 11/1969 | Chouings | 303/7 |
| 3,486,799 | 12/1969 | Greetree | 303/7 |
| 3,767,270 | 10/1973 | Urban | 303/7 X |
| 3,768,872 | 10/1973 | Urban et al. | 303/7 X |
| 3,854,556 | 12/1974 | Gee | 188/181 R |
| 3,893,696 | 8/1975 | Urban et al. | 303/40 X |
| 3,929,382 | 12/1975 | McNinch, Jr. et al. | |
| 3,929,383 | 12/1975 | Urban et al. | 303/40 X |
| 3,955,652 | 5/1976 | Nilsson et al. | 188/112 |
| 3,966,267 | 6/1976 | McNinch, Jr. et al. | 303/20 X |
| 4,060,284 | 11/1977 | Steiner | 303/100 |
| 4,327,414 | 4/1982 | Klein | 364/426 |
| 4,457,407 | 7/1984 | Monick et al. | 188/71.9 |
| 4,476,968 | 10/1984 | Urban et al. | 188/329 |
| 4,591,213 | 5/1986 | Rapoport | 303/93 |
| 4,606,586 | 8/1986 | Eckert et al. | 303/93 |
| 4,616,881 | 10/1986 | Muller et al. | 303/7 |

FOREIGN PATENT DOCUMENTS

| | | | |
|---|---|---|---|
| 8602323 | 4/1986 | PCT Int'l Appl. | 303/7 |
| 2057377 | 4/1981 | United Kingdom | 280/432 |

Primary Examiner—Andres Kashinkow
Assistant Examiner—Timothy Newholm
Attorney, Agent, or Firm—H. D. Gordon

[57] ABSTRACT

A tractor-(28) trailer (30) vehicle (24) brake system control for distributing the brake effort to obtain inter-tractor-trailer proportional braking ($H_1/V_1 = H_2/V_2$) by use of sensors (170, 172) mounted to the trailer only is provided. The control system senses (80) acceleration (a) and the ratio of vertical to horizontal forces ($H_F/V_F$) at the fifth wheel (34) by sensors (170, 172) mounted to the tractor (28) only and modulates the brakes to cause the ratio $H_F/V_F$ to equal acceleration.

7 Claims, 7 Drawing Sheets

TRACTOR-TRAILER BRAKE CONTROL SYSTEM

BACKGROUND OF THE INVENTION

1. Related Applications

This application is related to Ser. No. 043,063, now U.S. Pat. No. 4,768,840 and Ser. No. 043,010, both filed Apr. 17, 1987.

2. Field of the Invention

This invention relates to controls for brake systems for multiple vehicle systems (i.e. tractor - trailer vehicles). In particular, this invention relates to controls for vehicle brake systems which will distribute the braking effort between the individually controllable vehicle brake sites, such as between sub-vehicle brake systems, to achieve inter-vehicle proportional braking.

3. Description of the Prior Art

Brake systems, and the controls therefor, for vehicles, including heavy duty vehicles such as trucks, are, of course, well known in the prior art.

Brake systems for passenger cars are, in general, somewhat easier to design than brake systems for heavy duty vehicles such as trucks as the loading and maintenance of passenger vehicles will not vary to the extent loading and maintenance will vary in a truck, such as the loading on the tractor of a tractor-trailer which may comprise a tractor only, a tractor with an empty or lightly loaded trailer or a tractor with a heavily loaded trailer.

Brake systems of the anti-lock type, for all types of vehicles, are well known in the prior art. Briefly, these systems operate to obtain a maximized vehicle stability (i.e. maximized transverse coefficient of friction of braked wheels) by maintaining the longitudinal slip of the braked wheels within predetermined limits. This usually requires modulating the braking forces on an individual wheel and/or individual axle basis to maintain at least some wheel rotation.

Examples of prior art anti-lock systems may be seen by reference to U.S. Pat. Nos. 3,767,270; 3,768,872; 3,854,556; 3,893,696; 3,929,383; 3,929,382; 3,966,267; 4,392,202 and 4,591,213, the disclosures of all of which are hereby incorporated by reference.

Brake systems which control braking to achieve a driver demand, sensed driver demand in "brake-by-wire" manner, sense coefficient of friction and modified brake forces accordingly, sense load on a wheel and modified braking effort accordingly, sense wheel slip and/or used electronic signals to achieve more rapid trailer brake response are also disclosed in the prior art as may be seen by reference to U. S. Pat. Nos. 4,140,352; 4,327,414; 4,494,199; 4,512,615; 4,545,240; 4,591,213; 4,606,586; 4,616,881; and 4,648,663, the disclosures of which are hereby incorporated by reference.

While the prior art brake systems which modify braking effort in response to sensed parameters to achieve various goals, such as vehicle stability or the like, do, in general, provide enhanced vehicle braking, they are subject to further improvement. In the prior art systems for tractor-trailer vehicles, if braking effort between the tractor and trailer is to be controlled in a predetermined manner, a specially configured and equipped trailer is required.

SUMMARY OF THE INVENTION

In accordance with the present invention, many of the drawbacks of the prior art have been overcome or minimized by the provision of a vehicle brake control system particularly well suited for heavy duty articulated multiple vehicle systems such as tractor-trailers. The system provides the advantages of improved performance as to both operating costs and safety while being of a relatively lower cost than prior art brake systems.

The above is accomplished by providing a brake control system having means to sense the magnitude of the brake effort required by the operator (usually sensed as a percentage of displacement of the vehicle brake pedal) and means to distribute the braking effort between the braked wheels, or sets of braked wheels, to achieve proportioned braking.

When installed in a semi-truck tractor, the system preferably includes sensors in the connecting apparatus (i.e. the fifth wheel) for connecting the tractor to a selected trailer which will allow inter-tractor-trailer proportional braking without requiring specialized equipment on the trailer.

Accordingly, it is an object of the present invention to provide an improved vehicle braking system control for distributing the braking effort between the individually controllable subvehicle brake systems to achieve proportional braking.

This and other objectives and advantages of the present invention will become apparent from a reading of the detailed disclosure of the preferred embodiments taken in connection with the drawings.

The vehicle brake control system of the present invention is effective to distribute the braking effort between the individually controlled braked wheels or sets of wheels of the vehicle in multiple modes as a function of the magnitude of operator demand for braking effort.

Figure 5:
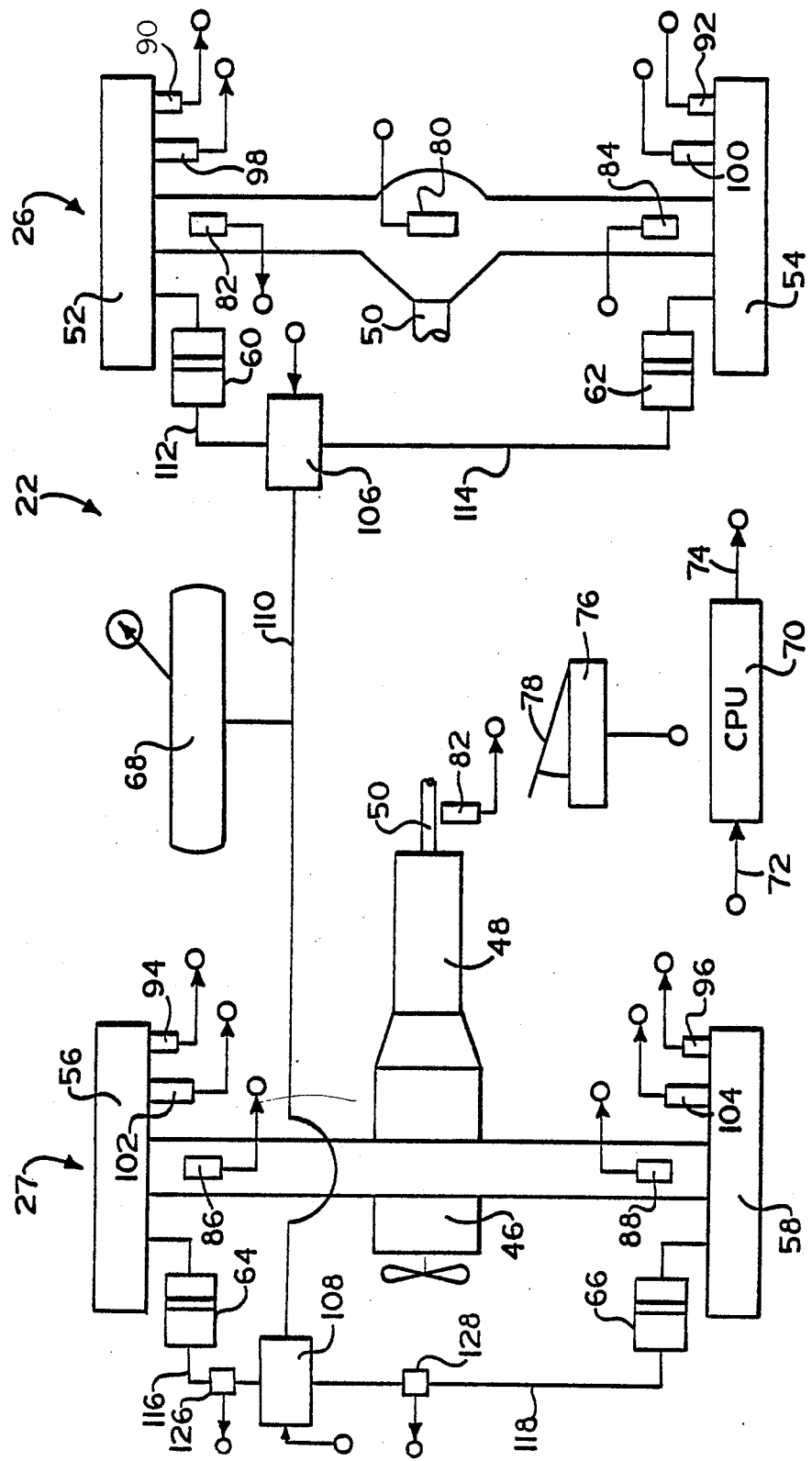
FIG. 5 is a force diagram for a braked wheel.

One of the modes, herein defined as the "proportional braking" mode, is well known in the vehicle industry and involves the "braking ratio", which is the ratio of tangential friction force to radial load (i.e. $F_F/F_N$ in FIG. 5) for the tire/road interface.

The limiting value, of course, is the coefficient of friction ("MU"). If each wheel or set of wheels develops tangential friction force (or braking force) to load in the same proportion, or ratio, then, to the extent each of the wheels have equal MU to slip relationships, the vehicle can utilize all of the available adhesion on all of its wheels at the same time. This principal and the advantageous effects of achieving equal braking ratios at each wheel is well known in the braking industry.

Specifically proportional braking, as used herein means a braking effort distribution on a vehicle where the ratio of tangential braking force to radial load force is (or very nearly is) the same for all wheels or sets of wheels. The wheels may be considered individually or taken in sets, the sets may consist of all of the wheels on one axle, all of the wheels on a tandem pair of axles (a bogey set), or all the wheels on one sub-vehicle when the vehicle is the combined total of several sub-vehicles.

Another, different, principal for the distribution of braking effort in a vehicle braking system is to create braking energy inputs related to some brake or vehicle system parameter other than the loads or tire to road adhesion factors. Some of these parameters are: balanced wear, or balanced work, or balanced temperature between brakes. Whatever the parameter chosen, the distribution of braking effort to balance it is, in general, different from the distribution of braking effort in proportional braking.

The braking system of the present invention, as it relates to a multiple vehicle system such as semi-truck tractor trailer system 24, involves at least the inter-vehicle braking effort distribution between tractor 28 and trailer 30, and may also involve the intra-vehicle braking effort distribution for tractor 28 and the intra-vehicle braking effort distribution for trailer 30.

Figure 1:
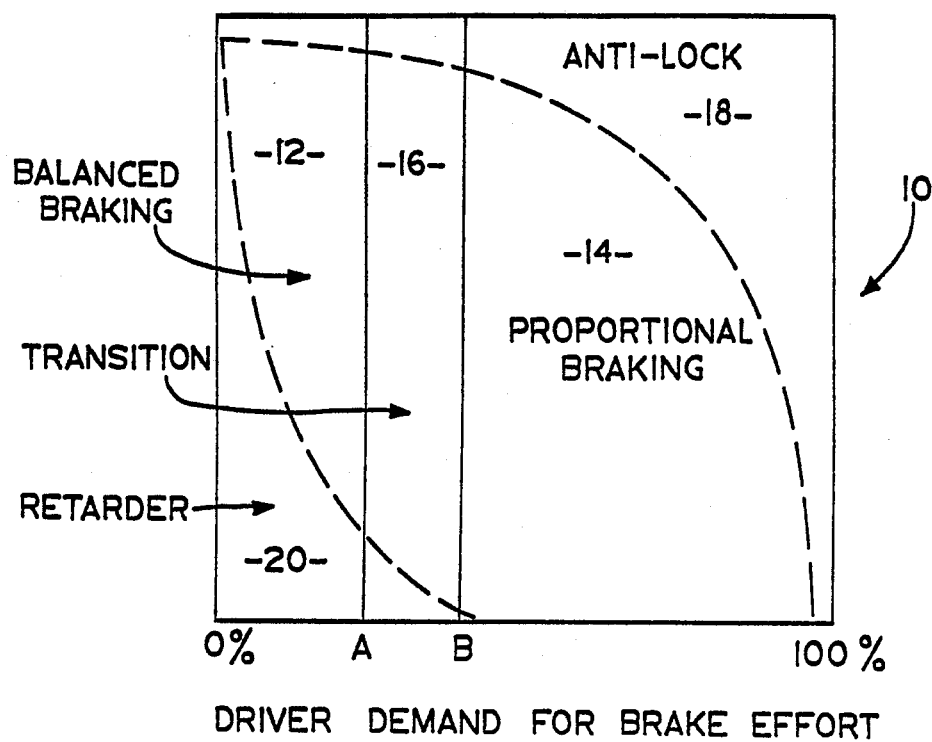
FIG. 1 is a schematic illustration of a multiple vehicle system in which the brake control system of the present invention may be utilized.
Figure 2:
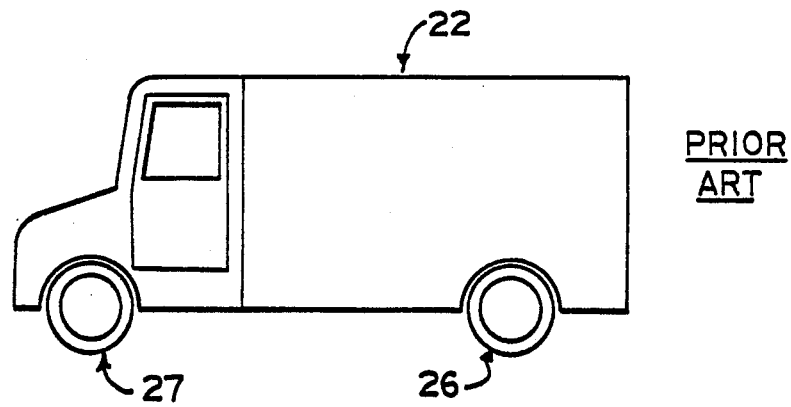
FIG. 2 is a schematic illustration of a prior art load sensor which may be utilized with the brake system of the present invention.
Figure 3:
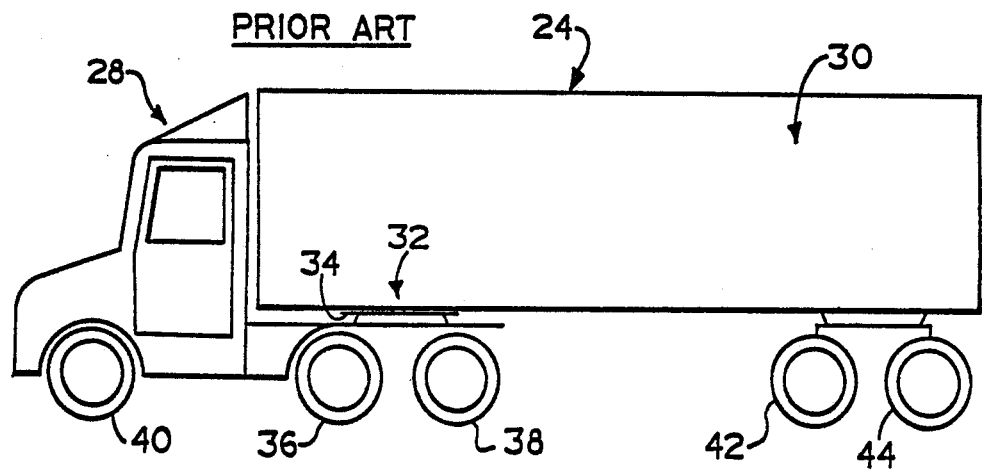
FIG. 3 is a schematic illustration of the brake system of the present invention for the multiple vehicle system of FIG. 1.

The braking system of the present invention is applicable to multi-vehicle systems such as the tractor 28 and trailer 30 system 24 illustrated in FIG. 1. Referring to FIG. 3, the braking system for the tractor 28 of multi-vehicle system 24 may be seen. Briefly, as is well known in the prior art, tractor 28 includes a front steer axle 40, which is usually not driven, and a tandem pair of rear drive axles comprising front-rear drive axle 36 and rear-rear drive axle 38. Wheels 140 and 142 are associated with the rear-rear drive axle 38, wheels 144 and 146 are associated with the front-rear drive axle 36 and wheels 148 and 150 are associated with the front steer axle 40. As is typical with tractors, dual tires are utilized with each wheel of the rear drive axles.

The rear drive axles 36 and 38 are driven by engine 46 through transmission 48 and driveline 50. Air actuated brakes 60, 62, 152 and 154 are provided for braking the rotation of wheels 144, 146, 140, 142, respectively, and air actuated brakes 64 and 66 are provided for braking the rotational speed of wheels 148 and 150, respectively. Rear brakes 60, 62, 152 and 154 are, as is well known in the prior art, of the same size and type as likewise are front brakes 64 and 66. In the system illustrated, the brakes are air actuated brakes of one of the well known types such as the "S" cam actuated drum brake type or the air disc brake type, the details of which are well known in the prior art and may be seen in greater detail by reference to U.S. Pat. Nos. 4,476,968 and 4,457,407, the disclosures of both of which are hereby incorporated by reference. As is known, while both of the front brakes and all of the rear brakes should be of the same size and type, it is not necessary that the front brakes same size and/or type as the rear brakes. Compressed air for actuating the brakes is supplied from a plurality of supply tanks 68, only one of which is shown, from the vehicle compressor (not shown) or the like.

The braking system includes a control unit 70, which for purposes of flexibility and responsiveness is preferably an electronic microprocessor based control unit having means 72 for receiving a plurality of input signals, means for processing the input signals in accordance with predetermined logic rules, and means 74 for issuing command output signals to various system operators.

A sensor 76 senses the operator's displacement of a brake pedal 78 to provide an input signal indicative of the driver's demand for vehicle stopping effort. Sensors of this type are known in the prior art and may be seen in greater detail by reference to U.S. Pat. Nos. 4,140,352; 4,327,414 and 4,512,615. Typically, such transducers will sense the displacement of and/or force applied to the brake pedal 78 and will provide an output signal proportional thereto. An input signal indicative of the deceleration of the vehicle may be provided by means of a decelerometer 80 which is fixed to the vehicle or by means of a transmission output shaft speed sensor 82 which will provide a signal indicative of the rotational speed of the drive line which may be differentiated by the CPU 70. Force sensors 82, 84, 86, 88, 156 and 158 are utilized to provide input signals indicative of the braking and load forces at the wheels respectively. The force sensors may be strain gauge based and/or of the linearly variable displacement transducer type as is well known in the prior art. For purposes of achieving a more accurate distribution of braking effort during a brake balancing mode, temperature sensors 90, 92, 94, 96, 164 and 166 may be provided for sensing the temperatures of the brakes at the wheels. The temperature sensors may be non-contact infrared sensors, or the like, as is known in the prior art. To allow the brake system to have an anti-lock mode, wheel speed sensors 98, 100, 102, 104, 106 and 162 are provided to provide input signals indicative of the rotational speed of the wheels.

The central processing unit 70 will, as will be explained in greater detail below, process the input signals in accordance with predetermined logic rules to generate command output signals to the control valves 168 and 175. Control valve 168 is connected to supply line 110 from one of the supply tanks and, in accordance with the command output signals, will independently pressurizes the conduits. A control valve 108 maybe utilized to independently control the braking at the front wheels 158 and 150. Accordingly, it may be seen that the braking effort at each of the wheels may be individually controlled in a closed loop manner in response to command output signals generated by the CPU 70 in response to the input signals received and processed thereby.

In a tractor-trailer vehicle system such as system 24 illustrated in FIG. 1, the inter-vehicle distribution of braking efforts is extremely important. Generally speaking, in order of magnitude of importance to achieve acceptable vehicle brake performance from both the minimized maintenance and maximized braking peformance and stability goals, inter-tractor-trailer proportioned and balanced braking is at least as important as intra-tractor proportional and balanced braking and is considered to be more important than intra-trailer proportional and balanced braking. Accordingly, in a braking system for a tractor-trailer, it is important that means be provided to achieve inter-tractor-trailer braking effort distributions as discussed above. Further, it is also important to remember that tractors 28 are often owned by different individuals than those that own the trailers 30 and, even within a fleet with commonly owned tractors and trailers, a typical fleet will have many many more trailers than tractors. Accordingly, it is highly desirable to provide a braking control system for a tractor-trailer vehicle system which requires little if any special equipment on the trailer and will provide relatively accurate tractor-trailer proportional braking and some degree of inter-tractor-trailer balanced braking.

To achieve a tractor-trailer braking system which will provide an acceptable degree of inter-tractor-trailer proportional braking, while requiring no additional equipment on the trailer, the tractor of the present invention is equipped with an accelerometer 80 for providing an input signal to CPU 70 indicative of the acceleration/deceleration of the vehicle and a pair of load sensors 170 and 172 for providing input signals to the CPU 70 indicative of the vertical and horizontal forces at the fifth wheel connection 34 between the tractor and trailer. In addition, a control valve 174, controlled by command outputs from CPU 70, will provide pilot or control signals to the standard trailer brake system control valves.

Figure 4:
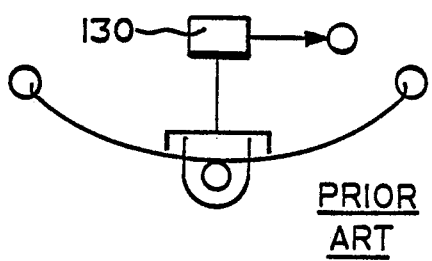
FIG. 4 is a schematic illustration of a standard trailer brake system which may be utilized with the brake system of FIG. 2.
Figure 9:
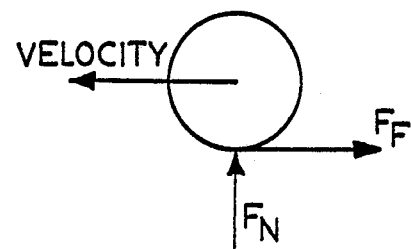

Referring now to FIG. 4, a prior art standard trailer brake system is illustrated. Briefly, the trailer includes a king pin 176 for selective engagement and disengagement to the tractor fifth wheel 34 as is well known in the prior art. The trailer includes a supply tank 178 connected to the tractor air system by means of a fluid connection 180. Trailer axles 42 and 44 support trailer wheels 182, 184, 186 and 188, each of which is provided with an air brake 190, 192, 194 and 196, respectively. Typically, all of the trailer brakes are controlled at the same pressure by means of a relay valve 198, which has an inlet 200 connected to the trailer supply tank 178, and a pilot valve portion 202 for receiving a pilot air signal from the tractor air system by means of connector 204. Connector 204 is designed for connection with connector 206 on the tractor. Typically, the connectors 204 and 206 and likewise connector 180 and its associated connection with the vehicle air system (not shown) that form the fluid connection are known as the "glad hand".

As may be seen by reference to FIG. 4, the prior art standard trailer 30 has a brake system wherein each of the brakes is actuated at the same pressure from a single output 208 from the pilot controlled relay valve 198 and are thus all actuated at the same pressure which pressure is a function of the pressure to the pilot valve portion 202. Accordingly, as all of the brakes 190, 192, 194 and 196 are actuated at the same pressure and as individual control of the actuating pressures thereof is not available in a standard trailer, controlling the distribution of the braking effort between the trailer brakes to achieve intra-trailer balanced or proportional braking on a controlled basis is not possible. However, by utilizing the tractor braking system illustrated, inter-tractor-trailer proportional and, to a degree, balanced braking, is obtainable.

Figure 6:
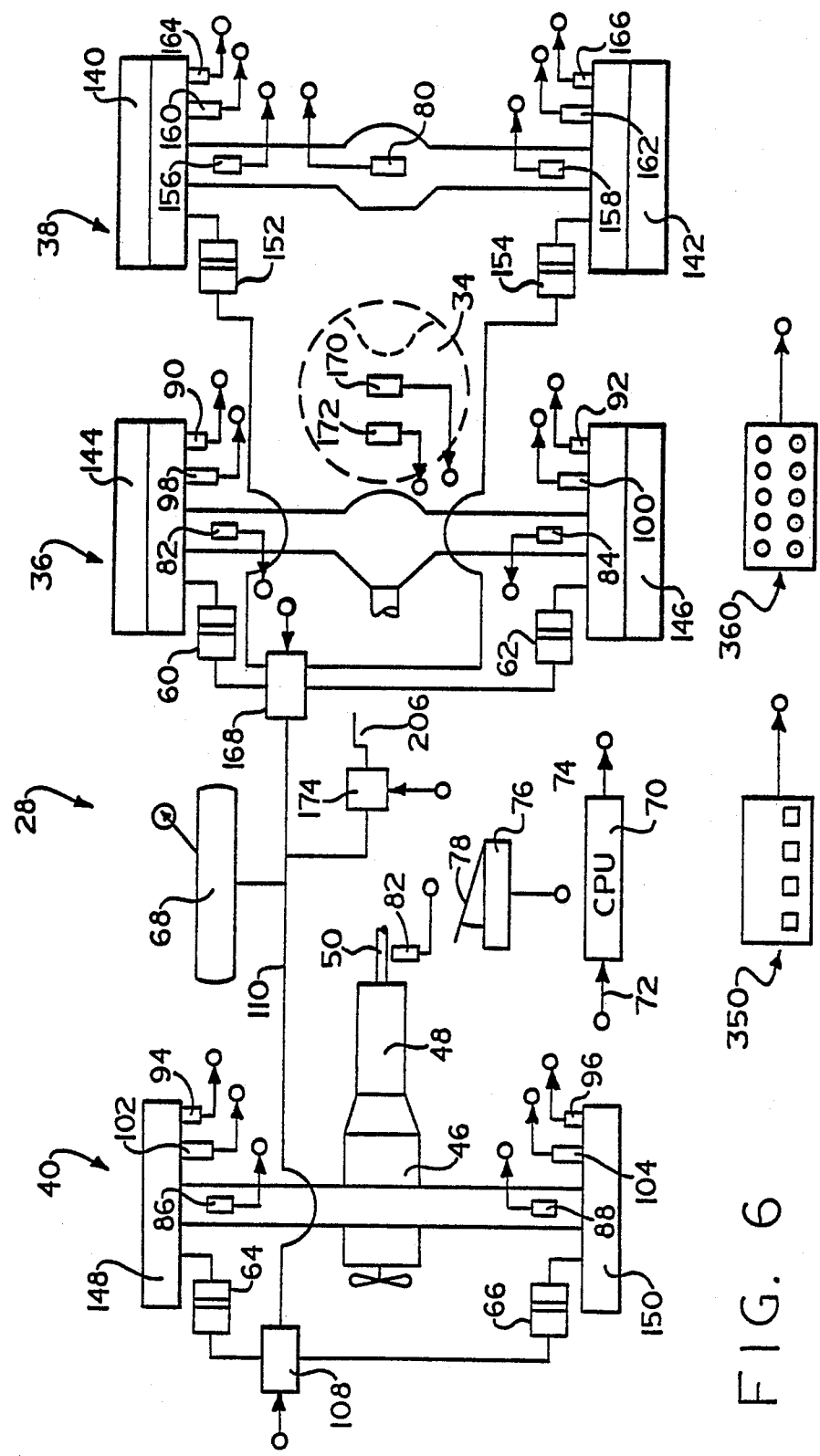
FIG. 6 is an equilibrium force diagram for the multiple vehicle system of FIG. 1.

As may be seen from the equilibrium force diagrams of FIG. 6, which do not include the aerodynamic, grade or transient forces:

$$H_1 = -M_1 a + H_F$$

$$V_1 = M_1 g + V_F$$

$$H_2 = -M_2 a - H_F$$

$$V_2 = M_2 g - V_F$$

where $M_1$ = mass of tractor 20
$M_2$ = mass of trailer 30

$H_1$ = braking force of tractor 28;
$H_2$ = braking force of trailer 30;
$H_F$ = horizontal force at fifth wheel 34/ king pin 178;
$V_1$ = weight supported by tractor axles;
$V_2$ = weight supported by trailer axles;
$V_F$ = weight on fifth wheel;
g = gravity
a = forward acceleration.

At tractor-trailer proportional braking conditions, the braking ratio of the tractor (taken as a unit) will be equal to the braking ratio of the trailer (taken as a unit), or;

$$H_1/V_1 = H_2/V_2$$

Additionally, the braking ratio of the interconnecting assembly ($H_F/V_F$) will equal the same value, i.e.:

$$H_F/V_F = H_2/V_2 = H_1/V_1$$

Given the above relationship is, it may be seen that, if $H_F/V_F = -a$, then tractor-trailer proportional braking is achieved. Accordingly, by modulating the pressure applied to the tractor brakes (control of valves 108 and 168) and/or to the trailer brakes (control of valve 174), to minimize the error equation:

$$E = H_F/V_F*C + A$$

tractor-trailer proportional braking, regardless of the load on the trailer, is provided and requires no additional sensors and/or control devices on the trailer.

Vehicle acceleration/deceleration can also be measured by use of the wheel speed sensors if proper allowance is made for slip. Of course, by using the vehicle acceleration/deceleration measurement device 80 in combination with the wheel speed sensors, a very accurate determination of wheel slip may be calculated.

Figure 7:
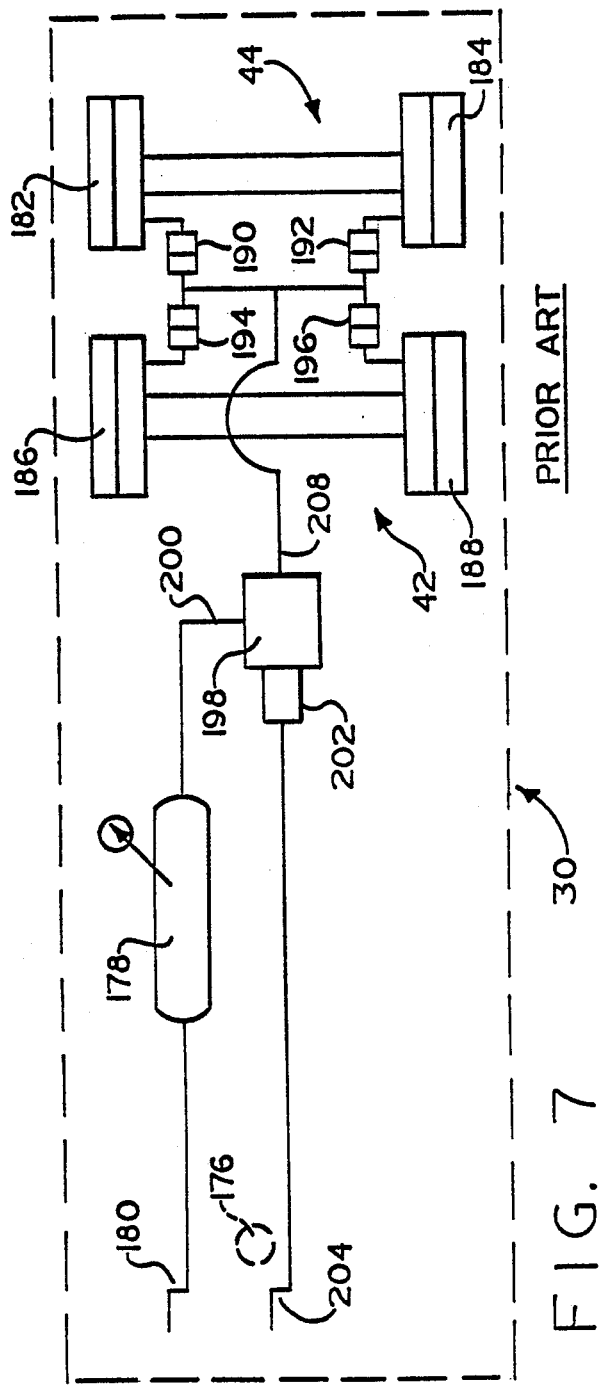
FIG. 7 is a schematic illustration of an alternate control device for the brake control system of the present invention.
Figure 10:
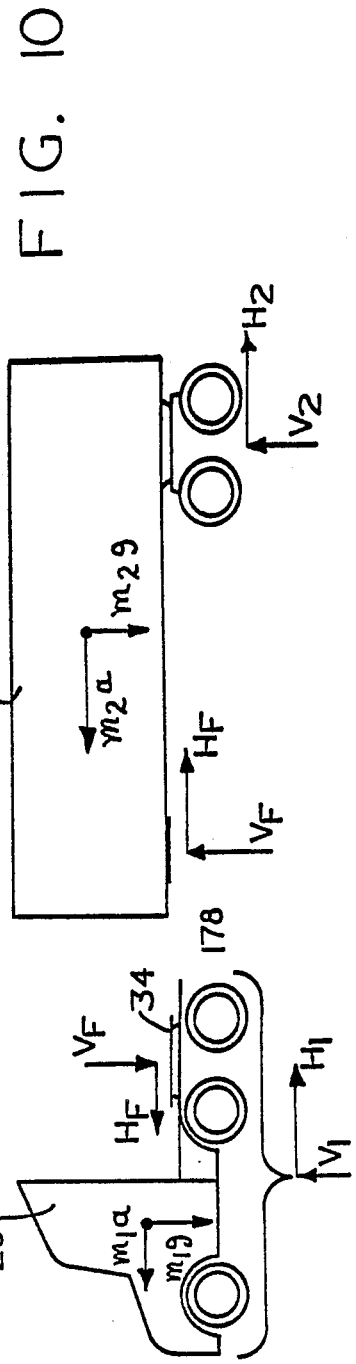
Figure 8:
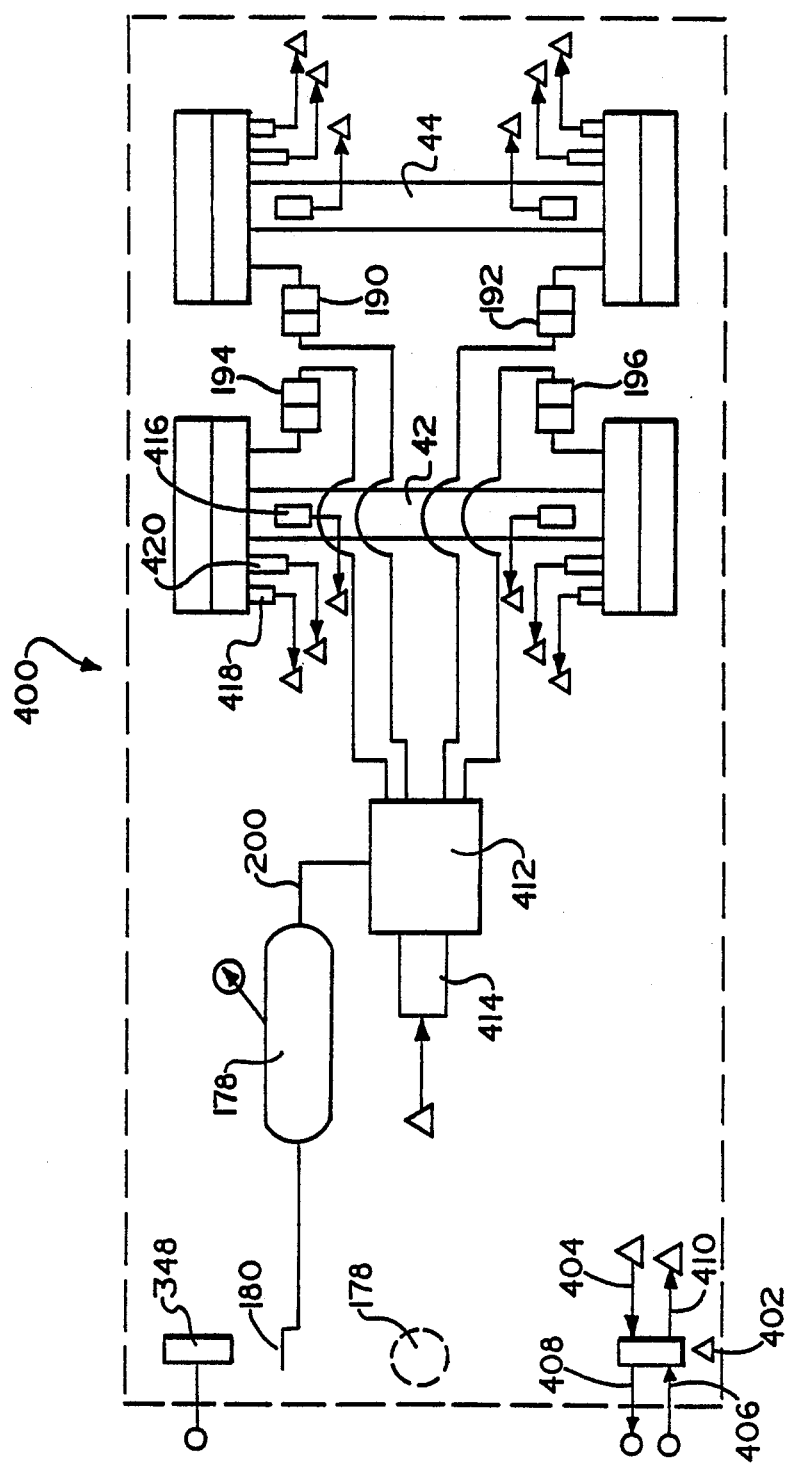
Figure 11:
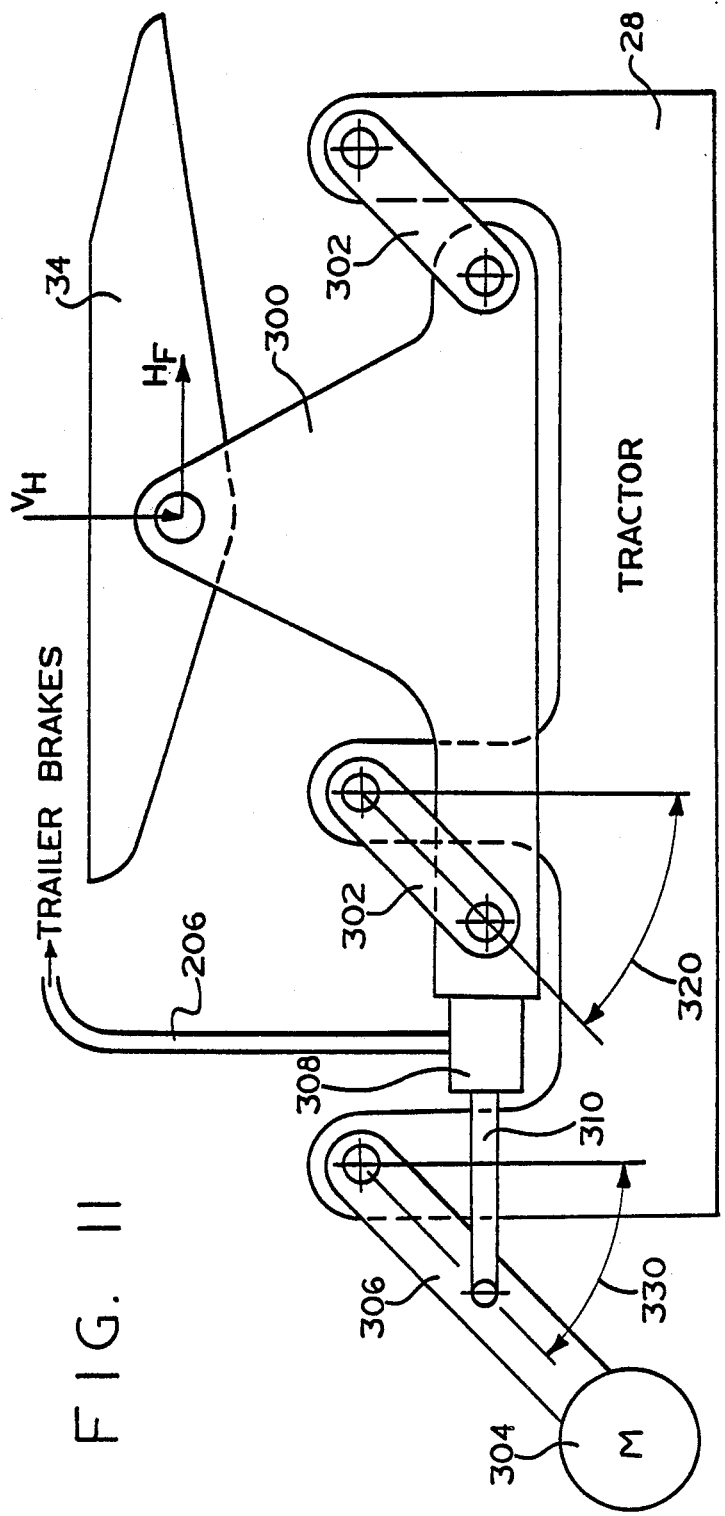

An alternate, totally mechanical system, attached solely to the tractor 28, for maintaining tractor-trailer proportional braking by modulating air pressure to the trailer brakes to minimize the equation:

$$E = H_F/V_F*C + A$$

is illustrated in FIG. 7.

The fifth wheel 34 is mounted to the tractor 28 by a fifth wheel carriage 300 pivotably supported by a pair of links 302. A mass 304 is pivotally mounted to the tractor 28 by a link 306. A valve 308 for controlling the supply of air to the trailer axle brakes is mounted to the fifth wheel carriage and is controlled by a horizontally extending valve plunger 310 fixed to link 306 for horizontal movement therewith. Valve 308 will replace the valve 174 illustrated in FIG. 6.

Links 302 define an angle 320 relative to vertical while link 306 defines an angle 330 relative to vertical. Briefly, the tangent of angle 330 is proportional to vehicle deceleration a while the tangent of angle 320 is proportional to the ratio $V_F/H_F$. Thus, if properly sized, at tractor-trailer proportional braking, (i.e. when $H_F/V_F = a$), the tangent of angle 330 will equal the tangent of angle 320.

When the tractor brakes are applied with greater braking ratio than the trailer brakes, both the mass 304 and the fifth wheel carriage 300 will swing forward with angle 320 being greater than angle 330. This will cause valve plunger 310 to increasingly extend into the valve 308 to increase the pilot air pressure in line 206 to the trailer control valve pilot port 202. If the trailer brake ratio is greater than the tractor brake ratio, angle 330 will be greater than angle 320 and plunger 310 will decreasingly extend into control valve 308 to decrease the pilot pressure supplied to pilot air conduit 206.

A braking system for a multi-vehicle system, such as a tractor-trailer semi-truck 24 is provided that allows the inter-tractor-trailer braking effort to be distributed in a manner to achieve inter-tractor-trailer proportional braking while utilizing special sensors and control located solely on the tractor.

While the preferred embodiments of the present invention have been described in connection with specific apparatus, the descriptions are made by way of example only and not as limitations on the spirit and scope of the invention as hereinafter claimed.

I claim:

1. A method for controlling the brake system on a tractor-trailer vehicle having a fifth wheel/king pin connecting structure and individually controllable tractor and trailer sub-vehicle brake systems, said method characterized by:

(a) sensing from a location on said trailer sub-vehicle the value of a parameter indicative of the vertical force exerted on the fifth wheel king pin/connection;

(b) sensing from a location on said trailer sub-vehicle the value of a parameter indicative of the horizontal force exerted by the king pin on the fifth wheel;

(c) sensing from a location on said trailer sub-vehicle the value of a parameter indicative of the acceleration of the vehicle;

(d) modulating the braking forces exerted by the trailer sub-vehicle brake system only to minimize the value of the expression:

$$E = \text{a function of } (H_F/V_F) + a$$

where:
E = error;
$H_F$ = horizontal force at the fifth wheel/king pin connection;
$V_F$ = vertical force imposed at the fifth wheel/king pin connection; and
a = forward acceleration of the vehicle (expressed in units of gravity).

2. The method of claim 1 wherein the steps of (a) and (b) comprise sensing the value of a parameter indicative of the value of the ratio:

$$H_F/V_F \text{ (in units of gravity)}.$$

3. A control system for a tractor-trailer brake system on a tractor-trailer vehicle having an independently controllable tractor sub-vehicle brake system, a fifth wheel connection for engaging a king pin carried by a trailer sub-vehicle and an individually controllable trailer sub-vehicle brake system, said control system characterized by:

first sensing means mounted on said trailer sub-vehicle for providing an input signal indicative of the value of the ratio of the horizontal force to the vertical force at the fifth wheel/king pin connection, second sensing means mounted on said trailer sub-vehicle for providing an input signal indicative of the acceleration of the vehicle;

a control unit mounted on said trailer sub-vehicle having means for receiving said input signals and for processing said signals in accordance with predetermined logic rules to issue command output signals and actuators responsive to said command output signals for modulating a controlled parameter at the trailer sub-vehicle brake system related to the brake force at the trailer sub-vehicle brake system;

said control unit including means for modulating the braking forces at said trailer sub-vehicle brake system only to minimize the value of the expression;

$$E = \text{a function of } (H_F + (V_F * a))$$

where:
E = error;
$H_F$ = horizontal force at the fifth wheel/king pin connection;
$V_F$ = vertical force imposed at the fifth wheel/king pin connection; and
a = forward acceleration of the vehicle (expressed in units of gravity).

4. A brake control system for a tractor-trailer brake system on a tractor-trailer vehicle having a tractor sub-vehicle equipped with an independently controllable tractor sub-vehicle brake system, a fifth wheel connection for engaging a king pin carried by a trailer sub-vehicle and a master control for controlling an individually controllable trailer sub-vehicle brake system, said control system characterized by:

first sensing means for providing an input signal indicative of the value of the ratio of the horizontal force to the vertical force at the fifth wheel/king pin connection, second sensing means for providing an input signal indicative of the acceleration of the vehicle;

a control unit having means for receiving said input signals and for processing said signals in accordance with predetermined logic rules to issue command output signals and actuators responsive to said command output signals for modulating a controlled parameter at each sub-vehicle brake system related to the brake force at the sub-vehicle brake system;

said control unit including means for modulating the braking forces at least one of said sub-vehicle brake systems to minimize the value of the expression;

$$E = \text{a function of } (H_F - V_F * a)$$

where:
E = error;
$H_F$ = horizontal force at the fifth wheel/king pin connection;
$V_F$ = vertical force imposed at the fifth wheel/king pin connection; and
a = forward acceleration of the vehicle (in units of gravity).

5. The control system of claim 4 wherein said first sensing means is mounted on said tractor sub-vehicle.

6. The control system of claim 5 wherein said first sensing means comprises transducers attached to said fifth wheel.

7. A brake control system for a tractor-trailer brake system on a tractor-trailer vehicle having a tractor sub-vehicle equipped with an independently controllable tractor sub-vehicle brake system, a fifth wheel connection for engaging a king pin carried by a trailer sub-vehicle and a master control for controlling an individually controllable trailer sub-vehicle brake system, said control system characterized by:

first sensing means for providing an input signal indicative of one of (i) the value of parameters indicative of the horizontal and vertical forces exerted on the fifth wheel/king pin connection and ii) the value of the ratio of the horizontal force to the vertical force at the fifth wheel/king pin connection, second sensing means for providing an input signal indicative of the acceleration of the vehicle; a control unit having means for receiving said input signals and for processing said signals in accordance with predetermined logic rules to issue command output signals and actuators responsive to said command output signals for modulating a controlled parameter at each sub-vehicle brake system related to the brake force at the sub-vehicle brake system;

said control unit including means for modulating the braking forces at at least one of said sub-vehicle brake systems to minimize the value of the expression E where E is a function of $H_F$, $V_F$ and a; where:

E=error;

$H_F$=horizontal force at the fifth wheel/king pin connection;

$V_F$=vertical force imposed at the fifth wheel/king pin connection; and, a=forward acceleration of the vehicle.

* * * * *